(12) United States Patent
Chen (10) Patent No.: US 9,769,359 B2
(45) Date of Patent: Sep. 19, 2017

(54) FLEXIBLE CAMERA DEVICE

(71) Applicant: Innova Electronics, Inc., Irvine, CA (US)

(72) Inventor: Ieon C. Chen, Laguna Hills, CA (US)

(73) Assignee: Innova Electronics Corporation, Irvine, CA (US)

( * ) Notice: Subject to any disclaimer, the term of this patent is extended or adjusted under 35 U.S.C. 154(b) by 74 days.

(21) Appl. No.: 14/107,388

(22) Filed: Dec. 16, 2013

(65) Prior Publication Data
US 2015/0172517 A1   Jun. 18, 2015

(51) Int. Cl.
| H04N 5/225 | (2006.01) |
| F16M 11/40 | (2006.01) |
| F16M 13/02 | (2006.01) |
| B62B 9/00 | (2006.01) |
| B62J 99/00 | (2009.01) |

(52) U.S. Cl.
CPC ............. H04N 5/2251 (2013.01); B62B 9/00 (2013.01); F16M 11/40 (2013.01); F16M 13/022 (2013.01); B62J 2099/0006 (2013.01)

(58) Field of Classification Search
CPC .... H04N 5/373; H04N 5/2251; H04N 5/2252; H04N 21/4223; G03B 17/56; G03B 17/561; G03B 17/563
USPC .................................................. 348/373–375
See application file for complete search history.

(56) References Cited

U.S. PATENT DOCUMENTS

| D334,560 | S | 4/1993 | Wilson |
| 5,347,211 | A | 9/1994 | Jakubowski |
| D377,622 | S | 1/1997 | Chen |
| 5,635,841 | A | 6/1997 | Taylor |
| 5,758,300 | A | 5/1998 | Abe |
| 5,767,681 | A | 6/1998 | Huang |
| 5,809,437 | A | 9/1998 | Breed |
| 5,859,628 | A | 1/1999 | Ross et al. |
| 5,884,202 | A | 3/1999 | Arjomand |
| 6,000,413 | A | 12/1999 | Chen |
| 6,055,468 | A | 4/2000 | Kaman et al. |
| 6,094,609 | A | 7/2000 | Arjomand |
| 6,169,943 | B1 | 1/2001 | Simon et al. |
| 6,225,898 | B1 | 5/2001 | Kamiya et al. |
| 6,263,268 | B1 | 7/2001 | Nathanson |
| 6,389,337 | B1 | 5/2002 | Kolls |
| 6,438,471 | B1 | 8/2002 | Katagishi et al. |
| 6,499,385 | B2 | 12/2002 | Protti |
| 6,535,112 | B1 | 3/2003 | Rothshink |

(Continued)

OTHER PUBLICATIONS

Range, Art Lebedev's Fleksimus Camera, Dec. 23, 2009, http://techbob.com/blog/2009/12/2009.

*Primary Examiner* — Tuan Ho
(74) *Attorney, Agent, or Firm* — Stetina Brunda Garret and Brucker (57) ABSTRACT

A flexible camera device is provided including an elongate flexible member and at least one camera connected to and supported by the elongate flexible member. A recording device is also connected to and supported by the elongate flexible member. The recording device is in electrical communication with the camera(s) for electrically communicating camera recorded images to the recording device. The flexible member may be connected to a variety of different support member to allow hands free recording of different events, as seen from multiple views.

25 Claims, 5 Drawing Sheets

(56) References Cited

U.S. PATENT DOCUMENTS

| | | |
|---|---|---|
| 6,587,768 B2 | 7/2003 | Chene et al. |
| 6,611,740 B2 | 8/2003 | Lowrey et al. |
| 6,650,318 B1 | 11/2003 | Arnon |
| 6,732,031 B1 | 5/2004 | Lightner et al. |
| 6,807,469 B2 | 10/2004 | Funkhouser et al. |
| 6,836,708 B2 | 12/2004 | Tripathi |
| 6,847,916 B1 | 1/2005 | Ying |
| 6,868,369 B2 | 3/2005 | Huang |
| 6,925,368 B2 | 8/2005 | Funkhouser et al. |
| 6,940,270 B2 | 9/2005 | Chen |
| D510,287 S | 10/2005 | Chen |
| 6,957,133 B1 | 10/2005 | Hunt et al. |
| 6,968,733 B2 | 11/2005 | Andreasen |
| 7,030,742 B2 | 4/2006 | Treadway |
| 7,085,680 B2 | 8/2006 | Huang |
| 7,116,216 B2 | 10/2006 | Andreasen |
| 7,209,813 B2 | 4/2007 | Namaky |
| RE39,619 E | 5/2007 | Andreasen |
| D545,223 S | 6/2007 | Chen |
| D558,621 S | 1/2008 | Rich |
| D559,137 S | 1/2008 | Protti |
| D560,129 S | 1/2008 | Rich |
| D560,527 S | 1/2008 | Rich |
| 7,325,775 B2 | 2/2008 | Chen |
| D563,249 S | 3/2008 | Chen |
| 7,363,149 B2 | 4/2008 | Klausner et al. |
| D569,280 S | 5/2008 | Chen |
| 7,376,497 B2 | 5/2008 | Chen |
| D571,241 S | 6/2008 | Andreasen |
| 7,437,227 B2 | 10/2008 | Andreasen |
| D581,822 S | 12/2008 | Madison |
| 7,464,000 B2 | 12/2008 | Huang |
| D590,387 S | 4/2009 | Chen |
| 7,520,668 B2 | 4/2009 | Chen |
| RE40,798 E | 6/2009 | Chen |
| RE40,799 E | 6/2009 | Chen |
| 7,603,293 B2 | 10/2009 | Chen |
| D610,586 S | 2/2010 | Chen |
| 7,722,264 B2 | 5/2010 | Kao et al. |
| 7,734,390 B2 | 6/2010 | Chen |
| D624,446 S | 9/2010 | Chen |
| D624,838 S | 10/2010 | Chen |
| D625,209 S | 10/2010 | Chen |
| D625,210 S | 10/2010 | Chen |
| D625,634 S | 10/2010 | Chen |
| 7,861,985 B2 | 1/2011 | Galvin |
| 7,904,219 B1 | 3/2011 | Lowrey et al. |
| 7,974,750 B2 | 7/2011 | Namaky |
| 8,019,503 B2 | 9/2011 | Andreasen |
| 8,024,083 B2 | 9/2011 | Chen |
| D646,188 S | 10/2011 | Chen |
| D646,599 S | 10/2011 | Chen |
| 8,032,419 B2 | 10/2011 | Chen |
| 8,068,951 B2 | 11/2011 | Chen et al. |
| 8,087,836 B2 | 1/2012 | Bevirt |
| 8,297,566 B2 | 10/2012 | Bevirt |
| 8,301,329 B2 | 10/2012 | Andreasen |
| 8,306,687 B2 | 11/2012 | Chen |
| 8,366,341 B2 | 2/2013 | Bevirt |
| 8,370,018 B2 | 2/2013 | Andreasen et al. |
| 8,630,765 B2 | 1/2014 | Chen |
| 2003/0067541 A1* | 4/2003 | Joao ............... 348/148 |
| 2003/0171111 A1 | 9/2003 | Clark |
| 2004/0110472 A1 | 6/2004 | Witkowski |
| 2006/0108485 A1 | 5/2006 | Enderle |
| 2008/0056808 A1 | 3/2008 | Bevirt |
| 2009/0101772 A1 | 4/2009 | Bevirt |
| 2009/0225159 A1* | 9/2009 | Schneider et al. .............. 348/82 |
| 2009/0276115 A1 | 11/2009 | Chen |
| 2011/0224866 A1 | 9/2011 | Chen |
| 2011/0228076 A1* | 9/2011 | Liu .................. 348/84 |
| 2011/0264322 A1 | 10/2011 | Chen |
| 2012/0010775 A1 | 1/2012 | Chenn |
| 2012/0151815 A1 | 6/2012 | Tate |
| 2012/0215398 A1 | 8/2012 | Chen |
| 2013/0187020 A1 | 7/2013 | Trotsky |
| 2013/0188943 A1 | 7/2013 | Wu |
| 2013/0229569 A1 | 9/2013 | Bevirt et al. |
| 2013/0233986 A1 | 9/2013 | Rasheta |
| 2014/0046800 A1 | 2/2014 | Chen |
| 2014/0052328 A1 | 2/2014 | Nguyen |

* cited by examiner

FLEXIBLE CAMERA DEVICE

CROSS-REFERENCE TO RELATED APPLICATIONS

Not Applicable

STATEMENT RE: FEDERALLY SPONSORED RESEARCH/DEVELOPMENT

Not Applicable

BACKGROUND

The present invention relates to cameras, and more particularly, to a portable, hands-free camera device that may be used to record sporting events, social activities and other functions.

Conventionally, cameras are held by a photographer, or mounted on a tripod or other supporting structure during photographic activities. More recently cameras have been mounted to helmets, such as may be worn by skiers, motorcyclist, parachutists, and other sports enthusiasts that desire to record the images they see as they engage in a sporting activity. While such helmet mounted cameras are useful during the particular sporting activity, they may be of little use for recording other activities such as social functions, tourist activities and other sporting activities, e.g. basketball, running, etc.

Inspection cameras have also been proposed for plumbing applications, e.g. sewer drain pipes inspections. Such devices include a camera connected to cable wired to a base unit, personal computer, or other device. Such devices are typically limited to use of a single camera and the cables do not have sufficient stiffness to elevate and support the camera(s). Nor are such devices typically portable to allow for convenient storage and transportation in a handbag or backpack, for simple deployment and use.

Conventional camera systems, which are typically limited to single camera, pointed in a single direction, are unsuitable to record activities that are based around a composite of multiple activities in different fields of view. For example, racing activities can involve matters of interest behind as well as in front of the runner, biker, driver, etc. Recordings of social functions may also utilize recordings of multiple individuals celebrating an occasion.

Health care situations, in a home or health care facility, may also be facilitated by simultaneously monitoring an image of the patient, along with images of instruments used to monitor the patient's vital signs, either or both of which images may be remotely monitored. Creative photographic activities may similarly involve the use of multiple cameras aimed at different directions. For examples, films involving a day in the life of a pet or person could utilize one camera directed at the subject person or pet, as well as camera facing forward of the person or pet, showing the scenes viewed by the person or pet. The cameras could be conveniently fixed to the person or pet and adjusted in various directions. It is further preferable if the images of the two cameras could be combined on a single screen for comparing the simultaneous views.

While flexible devices have become available to functions as camera mounts, such devices do not include integral cameras, nor have they had sufficient lengths to wrap around any convenient support member so that the camera(s) may be manipulated to direct the camera(s) towards any field(s) of view of interest.

Accordingly, it is desirable to provide a camera device that is portable and that can be conveniently secured in place by simply wrapping an elongated flexible member around any available bar, flange, post or other structure in order to elevate the camera and maintain the camera focused in a desired direction. It is also desirable that the device may incorporate multiple cameras which may be focused in different directions in order to provide multiple views of related activities. Further, it is desirable that such a device may incorporate a recording medium and/or functions to allow simultaneous views of multiple scene which can be communicated to remote locations for storage and display.

These and other objects and advantages are achieved in relation to the present invention which is described in relation to the illustrated embodiments.

BRIEF SUMMARY

A flexible camera device is provided including an elongate flexible member and at least one camera connected to and supported by the elongate flexible member. A recording device is also connected to and supported by the elongate flexible member. The recording device is in wired or wireless communication with the camera(s) for communicating camera recorded images to the recording device. The flexible member may be self-supporting or connected to a variety of different support members to allow hands-free recording of different events, as seen from multiple views.

The flexible member is designed to be a deformable in multiple directions to be engageable to different types of support surfaces. The flexible member may be wrapped around a surface for support, to secure the flexible member and the camera(s) in a desired position to view a desired person or area. The camera(s) may be connected to the recording device by a wired connection extending through the flexible member and/or by wireless connection between the camera(s) and the recording device. Such circumstances the camera(s) would be provided with a wireless communication circuit, such as a Bluetooth™ or Wi-Fi™ circuit.

In one embodiment the recording device comprises a cellphone, such as a smartphone or a tablet computer. Alternatively, the recording device may comprise other types of data acquisition and storage devices, such as an SD card. The device may also include a docking port in electrical communication with the camera(s) for electrically communicating camera images to a recording device connectable thereto.

Where the device is used to implement vehicle security or diagnostic functions the data storage device may communicate, via wired or wireless communication, with both the camera(s) and a diagnostic data acquisition and storage device, to synchronize, or otherwise correlate camera recorded data with contemporaneous diagnostic data to allow for a more complete analysis of circumstances associated with a driving pattern or a vehicle accident. The data can also be time stamped by the data storage device, to provide additional reference information.

The data recording device may be provided with program instructions to receive and store camera data and vehicle diagnostic data. The vehicle diagnostic data may be received from a data acquisition and storage unit connectable to a vehicle diagnostic port, where the data acquisition and storage unit includes a wired or wireless communication circuit for communicating with the recording device, e.g. a cellphone.

Where the device is used to implement health monitoring or health diagnostic functions, the data storage device may communicate, via wired or wireless communication, with both the camera(s) and a medical data acquisition and storage device, to synchronize or otherwise, correlate the camera recorded data with contemporaneous medical data to allow for a more complete monitoring and analysis of the circumstances associated with a medical condition. The data recording device may be provided with program instructions to receive, display and store camera data and contemporaneous medical diagnostic data. The medical diagnostic data may be received by the recording device from a data acquisition and storage unit connectable to one or more medical monitors. The data acquisition and storage unit may be wired or in wireless communication with the recording device. The recording device can also time stamp the data, to provide additional referenced information in the stored recording.

A cellphone or other recording device may also include programing instructions to time correlate camera recorded data with received diagnostic or medical data, and/or to communicate the camera recorded data and/or the diagnostic or medical data to a remote location.

The camera(s) may be provided by a rechargeable battery disposed within the camera(s) or within the elongate member. Alternately, the camera(s) may receive power from the data recording device or from another external power source.

DETAILED DESCRIPTION

Figures 1, 2:
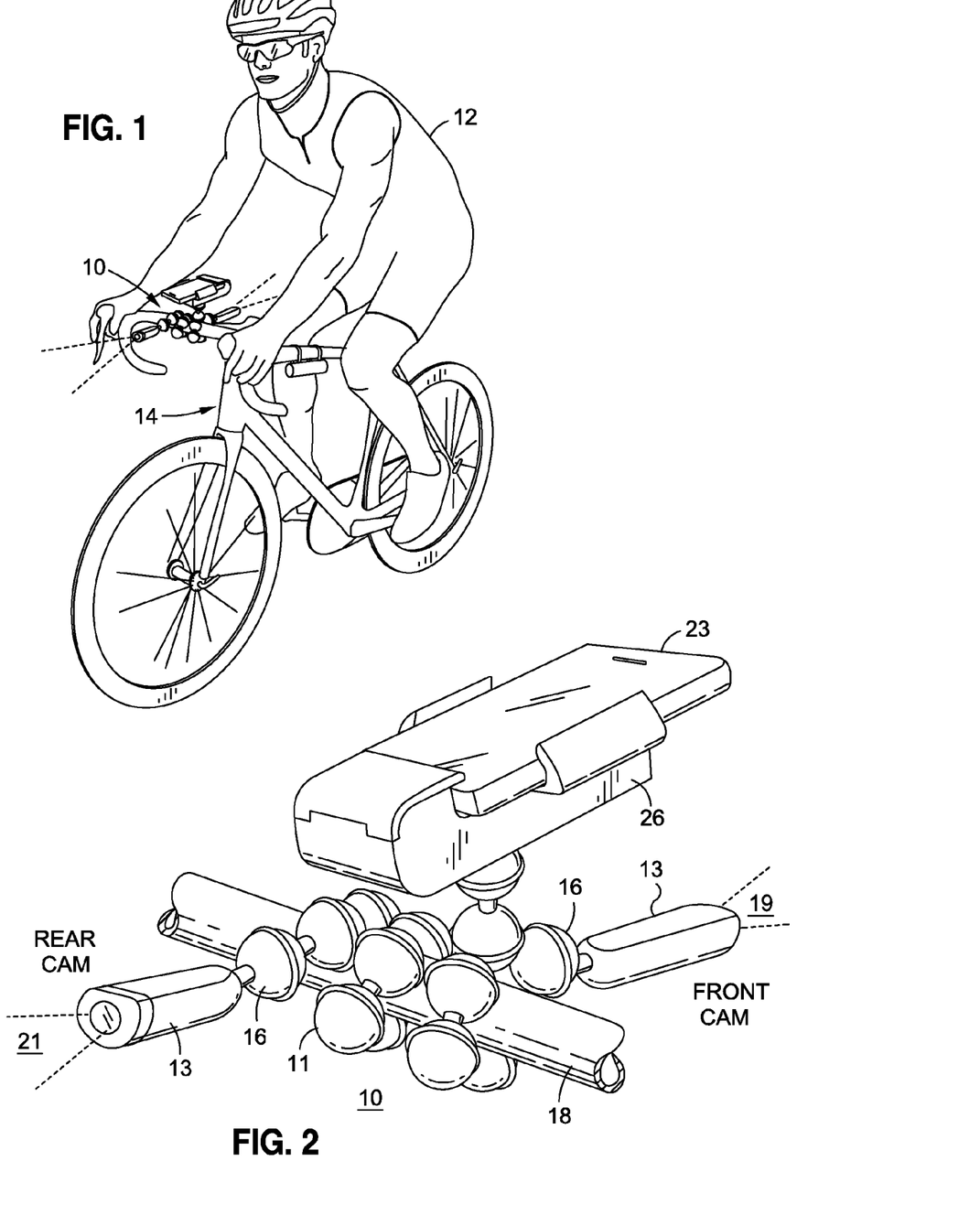
FIG. 1 is an illustration showing use of one embodiment of the present invention, mounted on a bicycle handlebar.
FIG. 2 is an illustration of one embodiment of the present invention in conjunction with a smartphone, mounted on a support member.

FIG. 1 illustrates one implementation of the present invention as mounted on a bicycle. As shown therein, the flexible camera device 10 is formed as an elongate flexible member or conduit 11, which are wrapped around a support member, such as bicycle handlebar 18 of bicycle 14 to support the camera head(s) or camera head(s) or camera(s) 13. The construction of conduit 11 may be implemented as series of ball and socket connectors which are adjustable to assume different orientations in order to capture images of different scenes or to connect or conduit 11 to a supporting surface. A user 12 riding bicycle 14 can mount the camera device 10 in a variety of ways, and adjust the cameras to any field of view of interest. In the illustrated implementation one camera is pointed forward of the bicycle and the second camera is pointed rearwardly of the bicycle. However, it is to be understood that the cameras can be directed in other direction as well, such as toward the face of the rider 12.

Referring to FIGS. 1 and 2, is further seen that device 10 includes cameras 13 which are connected to the elongate flexible member 11 by coupling member 16. As further described below, recorded images from cameras 13 may be communicated to a recording device, such as cellphone 23 secured to cellphone mounting bracket 26. Power for the cameras 13 may come from the cellphone/recording device 23, from batteries disposed in mounting bracket 26, or from batteries disposed in the cameras or coupling members associated with the cameras. However the camera 13 and cellphone/recording device 23 are electronically isolated from the support member, such as bicycle handlebars 18, or any electrical circuitry therein.

Figure 3:
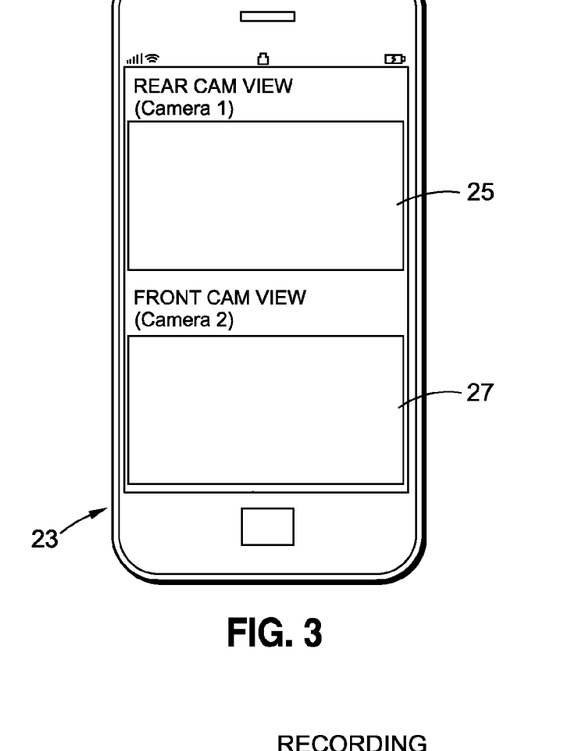
FIG. 3 is a front view of a smartphone with a simultaneously showing data recorded from two separate cameras.

As shown at FIG. 3, the cellphone 23 may include program instructions to display images from one or both cameras, such as images 25 and 27. The rider 12 may therefore be able to view images in rear field of view 21 while facing forward. Should the rider lean forward and downwardly, the rider will nonetheless be able to see images in a front field of view 19, by gazing at the display on cellphone 23.

Figure 4:
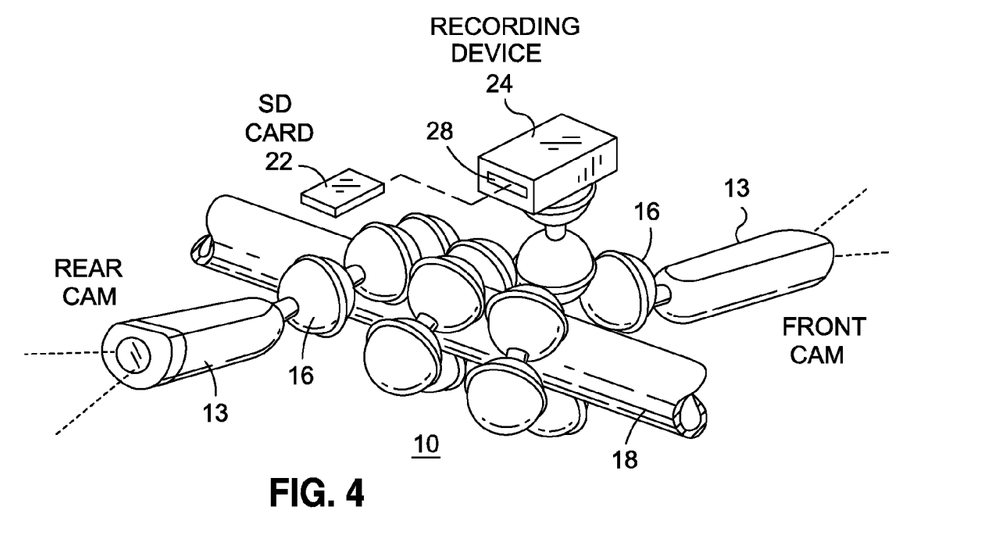
FIG. 4 is a view of another embodiment of the present invention in conjunction with a recording device, mounted on a support member.

FIG. 4 illustrates an alternate implementation of the present invention, wherein a different recording device is used. As shown at FIG. 4, the recording device 24 includes an SD card 22 that can be inserted into slot 28. The images from cameras 13 may thereby be recorded on SD card 22, without requiring use of a cellphone or other similar devices. However, as described in connection with FIG. 7, a cellphone or other display device may be temporarily connected to the recording device to insure that the cameras 13 are properly oriented to record the desired images.

As will be apparent to those skilled in the art, the choice of recording device used in conjunction with the camera device 10 is a matter of choice depending upon the availability of a smartphone, the desirability of displaying the recorded images to a rider or other user, the desirability of communicating the recorded images to a remote location by means of a cellular network and/or the desirability of transferring the recorded images to another storage medium using SD card connectors. Camera selection is also a matter of application and choice. One suitable camera head is the model number YN-207A marketed by Jiulan Global Group Limited (YINCAA) of China.

Figure 5:
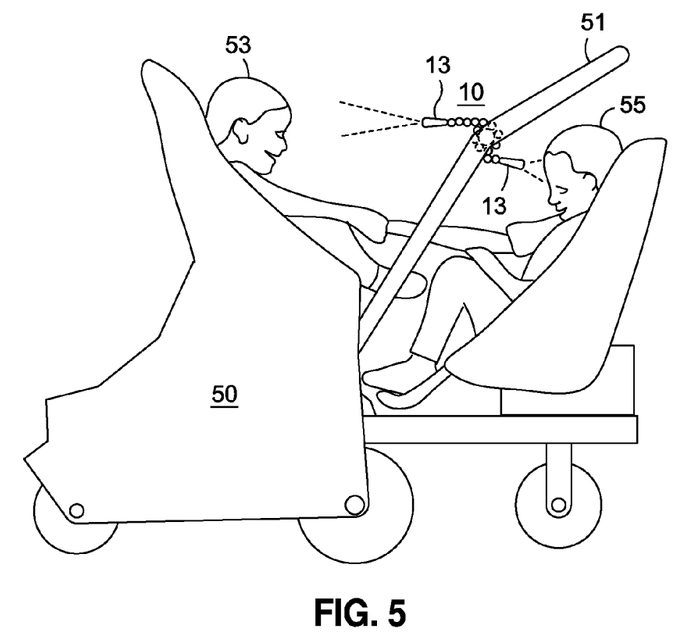
FIG. 5 also shows one embodiment of the present invention used in relation to tandem stroller.

Additional implementation of the present inventions are shown at FIGS. 5, 6, 9 and 10. Referring to FIG. 5, the camera device 10 is shown mounted to a support member 51 of tandem stroller 50. One camera 13 is directed towards child 53, and a second camera 13 is directed towards child 55. As a result the device can simultaneously record activity of the two children as they ride in stroller 50.

Figure 6:
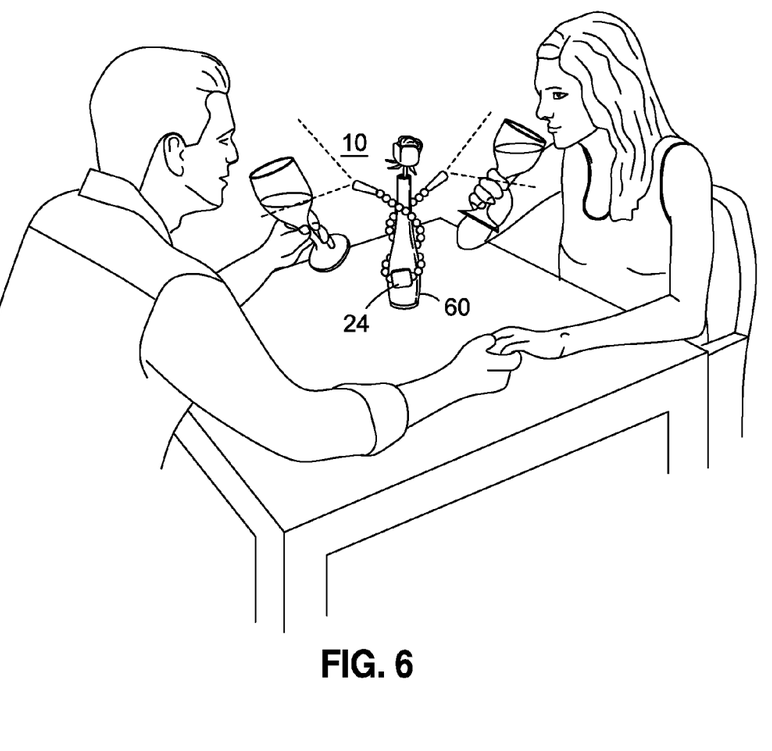
FIG. 6 shows one embodiment of the present invention as wrapped about a vase on a dinner table.
Figure 10:
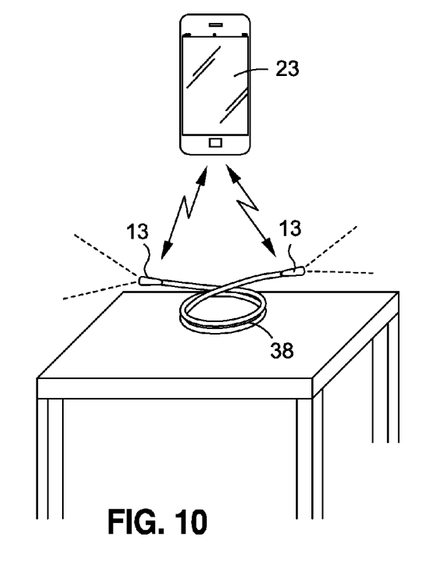
FIG. 10 is an illustration of an alternate embodiment of the flexible conduit, with a recording device being remotely located from the conduit.

FIG. 6 illustrates use of the camera device 10 wrapped around and supported by a flower vase 60, placed on a table between two companions to record a dinner or other event together. Such an implementation may also be used, for example, at a party where one camera pointed at the guest of honor, and with the second camera pointed forward to view the surrounding attendees. As it will be apparent to those skilled in the art, the elongate flexible conduit 11 may be formed to include sufficient stiffness such that the conduit 11 is self-supporting. For example, as shown in FIG. 10, the conduit can be coiled and placed on a table such that the camera(s) 13 are elevated from the base of the table, and aimed in any direction desired. However, the additional support provided by wrapping the flexible conduit around an object is useful to stabilize the position of the camera(s) particularly where the platform is in motion.

FIG. 10 illustrates an alternate embodiment of the flexible conduit 11 which does not include ball-joint members as shown in relation to prior embodiments. As shown therein, conduit 38 is formed as a length of smooth, gooseneck type conduit having a sufficient stiffness to support and elevate the camera(s), independent of any connection to external structures. Moreover, the embodiment shown at FIG. 10, the recording device 23 is not physically connected to the conduit, nor connected to the camera(s) by electrical wire. Rather, the recording device is in wireless communication with the camera(s) 13. This embodiment simplifies the construction of the flexible camera device, while still allowing common usage by anyone having a smartphone or other wireless communication device programed to interface with the camera(s). As one of ordinary skill in the art will recognize that the recording device itself need not be in direct communication with the flexible camera 10. Instead the flexible camera 10 may be located within wireless communication range of a router or other device which may in turn communicate with a smartphone, personal computer or other recording device.

Figure 9:
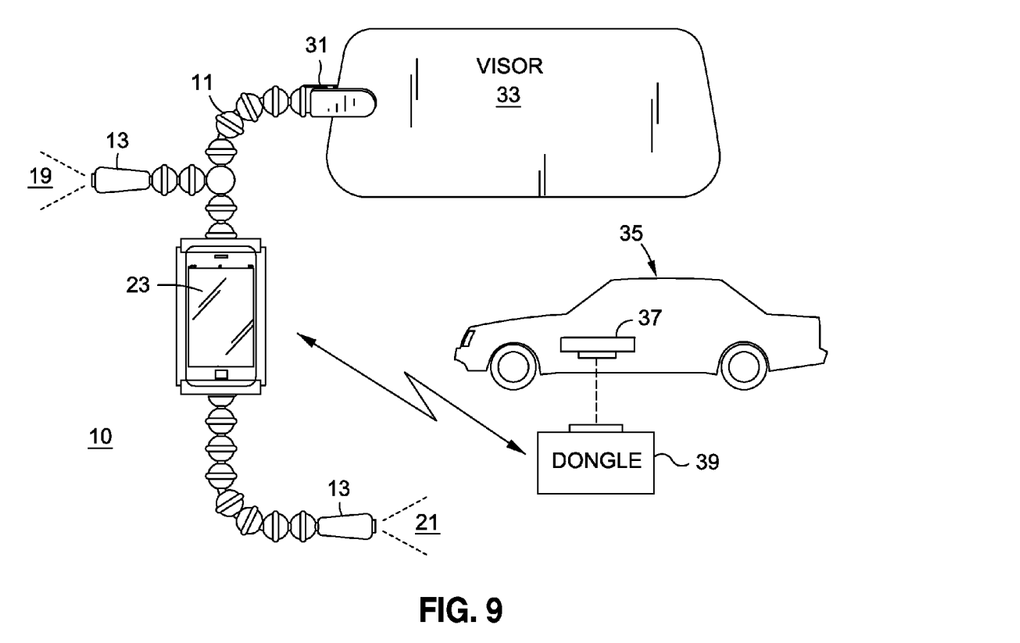
FIG. 9 is an illustration showing one embodiment of the present invention mounted to a vehicle support surface, wherein the recording device is in communication with a vehicle diagnostic system.

FIG. 9 illustrates an application of the invention in relation to a vehicle security system. As explained in more detail below, the camera device 10 may be used to record activities about or within a vehicle, either on a continuous basis or in response to information received from a vehicle diagnostic port, such as information indicating that a vehicle door has been opened or an alarm system has been activated.

As shown in FIG. 9, the recording device 23 may receive diagnostic data, or other data from the vehicle electronic control unit (ECU) of vehicle 35 via vehicle diagnostic port 37. A data acquisition and transfer device, such as dongle 29, may be connected to the diagnostic port 37 in order to receive and store vehicle diagnostic data. The vehicle data may include information generated by vehicle sensors and/or an alarm system indicating movement or entry into the vehicle, as well as other circumstances that may warrant recording the scenes within and/or outside of the vehicle 35.

In practice when the dongle 39 receives data indicating a potential interest in recording scenes within and/or outside of the vehicle 35 the dongle 39 may communicate such circumstances to recording device 23, which may then activate the camera(s) 13 either by wireless communication to camera(s) 13 or by wired connection extending through the flexible conduit 11 to camera(s) 13.

The recording device 23 may combine the camera recorded images and the diagnostic data from the dongle 39 to a single display to illustrate the camera recorded images and the diagnostic data in a single time correlated display. That data may be stored in a recording device, where it may be time stamped, and/or communicated to a remote storage device to ensure preservation of the data even if the camera device 10 is removed by an intruder, or otherwise lost or disabled.

FIG. 9 further illustrates one embodiment wherein the camera device 10 is secured to a vehicle interior surface, such as a visor 33 by clip 31. It is to be understood, however, that various other forms of connecting the camera device 10 to a vehicle's interior surface may be used without departing from the broader aspects of the invention. For example, where the conduit 11 is sufficiently long, it may be wrapped around a surface, such as a visor 33, a rearview mirror, headrest, garment holder, etc. for suitable support. In some embodiments it may desirable to discreetly hide camera device 10 so that an intruder may be unaware that his/her activities within or about the vehicle are being monitored.

In another embodiment the vehicle data may include driving characteristic data, indicating the driving characteristics of a particular driver, such as speed, braking distance, and other characteristics that may, for example, bear upon insurance risks. Camera recorded data could be continuously recorded, or triggered in response to receipt of predetermined vehicle data, such as reaching a specific vehicle speed.

As will be apparent to those skilled in the art, the flexible camera device 10 may be utilized for additional functions, such as recording an off-road drive in an all-terrain vehicle, or recording sporting activities, such as skiing, snowboarding, skating boarding, sky diving, etc. The flexible camera device may also be used for monitoring the activity or condition of a patient and/or equipment used to display the patient's vital signs or other conditions. The flexibility of the device and the ability to adjustably orient the cameras to capture images from different directions, along with recording and communication capabilities provides a great deal of flexibility for numerous applications.

Figure 7:
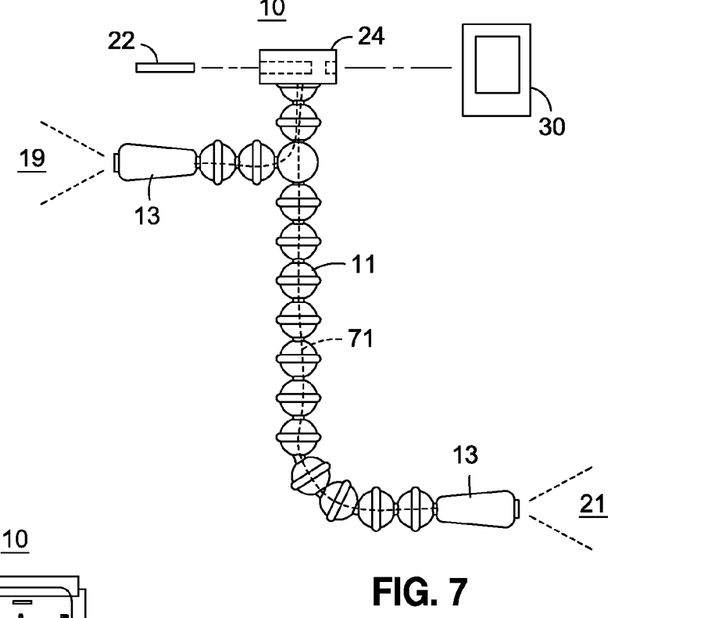
FIG. 7 is an illustration of one embodiment of the present invention showing hard wired connection between the recording device and the cameras.
Figure 8:
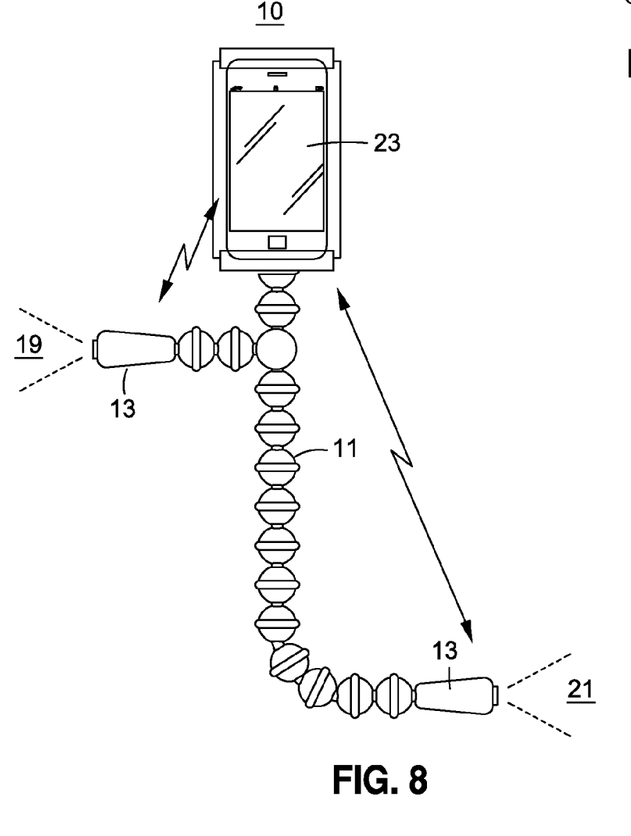
FIG. 8 is an illustration of another embodiment of the invention showing wireless communication between the cameras and the recording device.

As shown at FIGS. 7 and 8, the manner in which the images from camera(s) 13 communicated image data to one or more recording devices may be varied in accordance with the requirements of a particular application. As shown in FIG. 7, the camera(s) 13 are connected to recording device 24 by means of wire 71 extending through the flexible conduit 11. Display device 30 may also be connectable to recording device 23, in order to receive and display the images from cameras 13, to insure that the cameras are properly aimed for use. Thereafter, the display device 30 may be disconnected from the recording device 24.

FIG. 8 illustrates an alternate embodiment wherein images from the camera(s) 13 are communicated to the recording device 23 by means of wireless communication, using circuits such as Bluetooth™ or Wi-Fi™ circuits, integrated into the camera(s) 13. As is will be apparent to one skilled in the art, the recording device 23 need not be physically connected to the flexible conduit 11. The recording device or a wireless router, may be disposed anywhere within the wireless communication range of the local communication circuit that may integrated in to the camera(s) 13.

Figure 11:
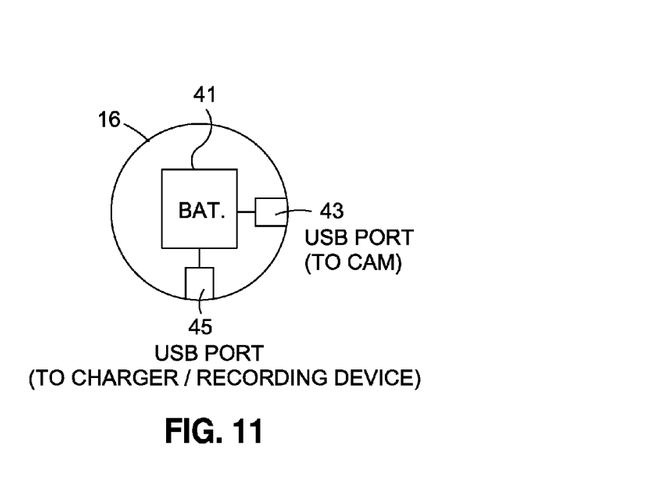
FIG. 11 is a sectional view illustrating the interior of a coupling member, used in conjunction with the present invention, showing connections between the battery and the camera and charger/recording device.

FIG. 11 illustrates an exemplary power supply configurations that may be used to power cameras 13. As shown therein, coupling member 16, also shown at FIG. 2, may include a battery 41 and connector port 43, to which camera 13 may be connected. Battery 41 can be recharged by input port 45, which can receive power from, for example, the recording device 17 and/or an external battery charger. In the presently preferred embodiment, ports 43 and 45 are formed as USB ports. However, it is to be understood that such USB ports 43 and 45 may be implemented as various connectors effective to receive and communicate power to cameras 13 or other inner connected devices as a particular application may require. Additional coupling members may be implemented within conduit 11 depending upon the desired application.

The above description is given by way of example, and not limitation. Given the above disclosure, one skilled in the art could devise variations that are within the scope and spirit of the invention disclosed herein, including various ways of constructing the device, engaging the device to a supporting surface, communicating recorded data from a camera to a recording device or powering the cameras. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A flexible camera device comprising:
an elongate flexible member deformably engageable to a support member the flexible member defining separate first and second portions;
at least one camera connected to and supported by the elongate flexible member first portion; and
a recording device connected to and supported by the elongate flexible member second portion, located separately from the first portion, in wireless communication with the camera, for communicating camera recorded images to the recording device;
wherein the camera and the recording device are both disposed external to the elongate flexible member and both operate independent of the elongate flexible member and any electrical circuitry disposed within the elongate flexible member.

2. The device as recited in claim 1 wherein the recording device comprises a data storage device.

3. The device as recited in claim 2 wherein the recording device includes a display and a cellular communications systems.

4. The device as recited in claim 1 wherein the camera is in wired electrical communication with the recording device.

5. The device as recited in claim 1 wherein the flexible member is deformable to adjust a field of view of the camera.

6. The device as recited in claim 1 wherein the support member is a bicycle handlebar.

7. The device as recited in claim 1 wherein the flexible member is deformable to wrap around a support member to maintain the orientation of the camera.

8. The device as recited in claim 7 wherein the flexible member is formed of a plurality of beaded members, each beaded member being deformably connected to an adjacent beaded member.

9. The device as recited in claim 3 wherein the recording device includes program instructions to communicate camera recorded data to a remote location.

10. The device as recited in claim 3 wherein the recording device is in communication with a vehicle diagnostic system, for accessing and storing vehicle diagnostic data.

11. The device as recited in claim 10 wherein the recording device includes program instructions to receive and store the vehicle diagnostic data and camera recorded data.

12. The device as recited in claim 1 wherein the support member is attached to a vehicle interior surface.

13. The device as recited in claim 12 further including a clip engaged to the flexible member and engageable to a support surface to secure the flexible member and the camera in a desired orientation.

14. The device as recited in claim 11 wherein the recording device includes program instructions to simultaneously display the camera recorded data and the diagnostic data.

15. The device as recited in claim 10 wherein the recording device includes program instructions to communicate the camera recorded data and the diagnostic data to a remote location.

16. The device as recited in claim 1 wherein the camera includes a rechargeable battery.

17. The device as recited in claim 1 wherein the camera receives power from the recording device.

18. The device as recited in claim 2 wherein data storage device is connectable to a display device, for displaying images recorded by the camera, to insure proper orientation of the camera.

19. The device as recited in claim 3 wherein the flexible member defines first and second ends, where the camera is engaged to the first end and the recording device is engaged to the second end.

20. The device as recited in claim 1 wherein the support member provides no operational interaction with the camera or the recording device, other than to provide mechanical support therefore.

21. A flexible camera device comprising:
first and second elongate support members, the first elongate flexible member being deformably engageable to a support member, the flexible member defining separate first and second portions;
at least one camera connected to and supported by the second elongate flexible member first portion; and
a recording device connected to a recording-device mounting bracket, wherein the recording-device mounting bracket is connected to and supported by the first elongate flexible member second portion, the recording device being located separately from the at least one camera, in wireless communication with the at least one camera, for communicating camera recorded images to the recording device.

22. The device as recited in claim 21 wherein the elongate flexible member first portion defines first and second arms, and wherein a first camera is connected to and supported by the first arm and a second camera is connected to and supported by the second arm.

23. The device as recited in claim 21 wherein the at least one camera receives power from batteries disposed in the recording-device mounting bracket.

24. A flexible camera device comprising:
an elongate flexible member deformably engageable to a support member, the flexible member defining separate first and second portions;
at least one camera connected to and supported by the elongate flexible member first portion; and
a recording device connected to and supported by the elongate flexible member second portion, the recording device being located separately from the at least one camera and in wireless communication with the at least one camera, for communicating camera recorded images to the recording device, the recording device further being in communication with a data acquisition and transfer device for receiving and storing vehicle diagnostic data from the data acquisition and transfer device.

25. The device as recited in claim 24 wherein the elongate flexible member includes a first and second arms, the first and second arms coupled to extending from opposing sides of the recording device.

* * * * *